Patented July 13, 1943

2,324,124

UNITED STATES PATENT OFFICE 2,324,124

WATER-SOLUBLE BERYLLIUM-PHOSPHATE GLASS

Milton Williams, Houston, Tex., assignor to Standard Oil Development Company, a corporation of Delaware No Drawing. Application September 21, 1937, Serial No. 164,871

9 Claims. (Cl. 252—8.5)

This invention is directed to new complex water-soluble, phosphate glasses, a method for making them and methods in which they can be utilized.

The glasses prepared by the method of the present invention are useful in a great many arts. In general, they are excellent conditioners for hard water, are useful in the prevention of boiler scale and in its removal from boilers, are satisfactory dispersing agents for use in the purification of ceramic clays, are suitable for use as buffer salts, are useful additions to scouring powders and soaps for washing greasy articles, and are excellent addition agents for drilling muds. It is with relation to this last use that they are hereinafter more specifically described.

A drilling fluid is a system comprising three main constituents; namely, water, colloidal matter, consisting of both gel forming and non-gel forming types of colloids, and large particles suspended in the water. A typical mud fluid may weigh from 8–18 lbs./gallon. Of the two types of colloids present, the gel forming type is definitely the more important, for this group imparts the necessary properties of an efficient drilling fluid, that is, stability of suspension, thixotropy, viscosity, pore sealing, and gel characteristics in general. Colloids of the non-gelling type, together with the larger particles, contribute somewhat to viscosity but more particularly to the density of a drilling fluid. It is generally desirable in drilling practice to maintain the viscosity below about 25 centipoises as measured by the Stormer viscosimeter at 10 revolutions per second.

The general principles of the rotary drilling method have been described in various patents; for example, the U. S. patent to Lawton, Loomis and Ambrose, No. 1,999,766, dated April 30, 1935. Likewise, the desirable properties of a drilling mud which must be controlled during the course of rotary drilling include the density, viscosity, gel strength, and sand content. The density must be maintained sufficiently high so that the hydrostatic head of the column of mud in the bore hole is greater than the pressure of the fluids contained in the porous formations penetrated by the bore hole. The viscosity and gel strength of the mud must be controlled within reasonable limits in order that the mud can perform satisfactorily its functions of removing rock cuttings from the well, releasing these cuttings at the surface of the earth, lubricating the bits, preventing caving of loose formations, and preventing the settling of cuttings in the well when mud circulation is discontinued.

One of the most important operations in treating a drilling mud involves the reduction of gel strength and viscosity of the mud. This type of treatment results in reducing the load on the pump which circulates the mud and thereby permits the pump to handle more fluid, thereby permitting faster drilling of the bore hole. Also, rock cuttings are permitted to settle out of the mud relatively rapidly, reducing abrasion on the machinery of the circulating system of the mud. Similarly, the tendency of the mud to entrain gas is reduced. Many other advantages of a mud of the proper viscosity and gel strength will be apparent to those skilled in the art of drilling wells.

Many of the drilling troubles which are experienced are directly attributable to muds of excessive viscosity. The most usual cause of excessive viscosity in Gulf Coast muds in the United States at certain depths is due to the quantity of colloidal materials in the natural mud and to an excessive concentration of calcium compounds. In drilling wells for oil or gas, it is often necessary to sink the wells to a depth of several thousand feet, wells more than 10,000 feet deep being not at all uncommon. At these and even more shallow depths, formation temperatures may exceed 200° F. It has been found that increases in temperature cause the viscosity and gelation of drilling mud to increase. It has also been found that the common dispersing agents which have been used to reduce the viscosity and gel strength of drilling muds give very temporary effects at high temperatures, and in some cases, if a mud is treated with an agent for reducing the viscosity, the viscosity of the sample after subjection to a high temperature, i. e., 200° F., will be higher than it was originally.

I have discovered that the viscosity and gelation of a drilling mud can be effectively reduced and maintained at approximately the same reduced value even after the mud is subjected to high temperatures for long periods of time, by the addition of a complex, the formation and use of which is described in subsequent paragraphs.

In general the water soluble glasses of the present invention are prepared by dissolving in a phosphate melt an oxygen containing compound of beryllium or boron, the latter being preferred, and, after solution is complete, quickly cooling the melt to solidification. The oxygen-containing compound employed may be an oxide or carbonate or other oxygen containing salt of the metals mentioned which are convertible into the oxide of the metal by heating, or, in the case of boron, it may be an alkali metal or an alkaline earth metal borate.

The phosphate melt may be any of the known alkali metal phosphates. The ratio between the alkali metal, the phosphorus and boron or beryllium, as the case may be, will vary with each phosphate and each compound of boron or beryllium. This ratio can be varied at will by adding caustic alkali and/or phosphorus pentoxide, and/or boron or beryllium oxide as desired. In the case of boron complexes, the melt may, even, be made of a mixture of alkali metal oxide, phosphorus pentoxide and boron oxide and a glass having mud treating properties, although somewhat inferior to those made from phosphates and boron oxide, will be obtained. There are operating difficulties with this procedure, however, due to the action of the free alkali metal oxide and the nature of phosphorus pentoxide.

In general, the ratio between the alkali metal, phosphorus and boron or beryllium may be varied over a wide range. There may be some differences in the rate of solubility of the glasses produced, but all will dissolve in water if given sufficient time. In the case of boron glasses the ingredients will usually be so selected that the amount of boron in the final product calculated as boric oxide, will constitute not more than 30%, by weight, of the product. In the case of beryllium glasses any ratio of the ingredients that can be produced by dissolving as much beryllium oxide as possible in any available alkali metal phosphate will be suitable.

An exception to the wide choice of initial materials and the proportions thereof is in the production of a glass having a ratio of alkali metal to phosphorus of 1:1. This is the preferred product according to the present invention since it is easy to make uniformly and gives uniformly good results as a treating agent.

In the production of this preferred product it is preferred, first of all, to employ a phosphate which, upon pyrolysis, yields sodium hexametaphosphate. The only phosphates known to be capable of doing this are mono-sodium phosphate, sodium dihydrogen, pyrophosphate, sodium meta phosphate and sodium hexametaphosphate itself. The oxide of boron or beryllium must be employed with one of these phosphates in order that the product may have a 1:1 ratio of alkali metal to phosphorus. In the manufacture of a boron complex from these materials it has been found that the rate of solution of the product decreases with the percentage of boric oxide used, becoming very slow when 10% is exceeded. Preferably, from 2% to 10% of boric oxide is employed.

It is also possible to prepare a glass by dissolving borax in one of the above enumerated phosphates. In preparing such a melt it is necessary to add the borax slower than one adds boric oxide because borax contains ten molecules of water and will cause foaming if added too quickly. The melt prepared from borax appears to be somewhat inferior in the sequesteration of calcium salts to that prepared from boric oxide. Both of these melts, however, are superior to sodium hexametaphosphate as a mud treating agent.

In the manufacture of these melts the compound of boron or beryllium is dissolved in a melt of the phosphate, or is mixed in the dry state with the phosphate and melted with it, and the resulting solution is rapidly chilled. Solution can usually be accomplished at about red heat although in some cases it is necessary to heat the melt to about 1000° C. in order to obtain a clear solution. Chilling is accomplished by pouring the melt in a fairly thin layer onto a water cooled plate or drum. Chilling should be accomplished in about 1 to 4 minutes.

The drilling muds which may be treated with the complex phosphate glasses of the present invention may be aqueous dispersions of the natural clay formations encountered in drilling any type of well. The drilling mud may be prepared from surface clays, bentonite clays of the aquegel type, or the like. The clays may contain weighting materials, such as barytes, iron oxide, litharge, or the natural shales or other mineral matter picked up during the drilling operations.

Ordinarily, the treatment is applied by adding aqueous solutions of the complex phosphate-oxide material to the mud as it flows around the ditch at the surface of the earth in the circulating system of the well. This is the preferred method because the melt does not dissolve very rapidly in water, usually requiring several hours for complete solution. It is best, therefore, to use preformed solutions. However, the material can be added in its solid form or may be mixed with clays or weighting materials prior to adding it to the mud. When this procedure is followed there is some danger that the complex may settle out before dissolving and lead to non-uniformly treated mud. In any event, additions of amounts of the complex varying from traces up to 5% by weight of the complex to the mud are contemplated.

Examples of the use of these compounds to reduce the viscosity of a drilling mud follow. In these examples the unit of viscosity is, unless designated as centipoises, driving weight in grams required to sustain a velocity of 600 R. P. M. on the Stormer viscosimeter. The driving weight is a measure of viscosity and serves as a basis of comparison.

*Example I*

About 7%, by weight, of boric acid was dissolved in a melt of sodium hexametaphosphate in a crucible. Solution being complete, the crucible was immersed in cold water. The melt solidified immediately to a transparent glass having a vitreous lustre. In contra-distinction to a melt of sodium hexametaphosphate, the melt expanded on cooling. A solution of the melt did not respond to the tumeric test for a borate.

1 cc. of a 5% solution of the melt reduced the viscosity of 200 cc. of a drilling mud from 38 centipoises at 600 R. P. M. to 17 centipoises at 600 R. P. M.

The superiority of this complex over hexametaphosphate as a mud treating agent is demonstrated by the following results of tests on the fade characteristics of the two substances. Two samples of mud of 200 cc. each were treated respectively with 1 cc. of a 5% solution of sodium hexametaphosphate and a 1 cc. of a 5% solution of the boric oxide melt, and placed in a steam chest maintained at 60° C. for 20 hours. After this treatment the first sample had a viscosity of 24 centipoises and the second had a viscosity of 18 centipoises at 600 R. P. M. After storage for 48 hours more in the steam chest, the first sample had a viscosity of 32 centipoises and the second a viscosity of 22 centipoises at 600 R. P. M. After further storage for 24 hours in the steam chest the first sample had a viscosity of 40 centipoises and the second a viscosity of 26 centipoises at 600 R. P. M.

A second sample of mud had a driving force of 130 grams. 1 cc. of the 5% solution of the boric oxide melt in 200 cc. of mud reduced this to a viscosity of 85 grams. 2 cc. of the melt in 200 cc. of mud reduced the viscosity to 80 grams. 1 cc. of sodium hexametaphosphate in 200 cc. of mud reduced the viscosity to 100 grams. 2 cc. of the phosphate in 200 cc. of the mud reduced the viscosity to 93 grams.

In order to demonstrate the sand settling power of the boric oxide melt, 300 grams of 80-100 mesh sand were added to 300 grams of the mud referred to above, and the mixture stirred. After vigorous stirring 100 cc. of the mud were poured into a graduate and allowed to stand for five minutes. Then the top 5 cc. were poured into a 15 cc. centrifuge tube. 10 cc. of $H_2O$ were added and the mixture centrifuged rapidly for 4 minutes. The volume of sand thrown down from the sample was 2.5 cc., or 50% by volume, of the decanted mud sample.

This procedure was repeated except that 1 cc. of a 5% solution of the boric oxide melt was added to the 100 cc. sample of the mud. In this case the amount of sand thrown down in the centrifuge amounted to less than ½% by volume of the 5 cc. sample subjected to centrifuging, thereby indicating that the sand in this sample had settled more rapidly in the graduate containing the 100 cc. sample. When this procedure was repeated with a 100 cc. sample of the mud, to which 1 cc. of a 5% solution of sodium hexametaphosphate had been added, the sand thrown down in the centrifuge amounted to 5% by volume of the 5 cc. sample of mud centrifuged.

*Example II*

5% by weight of boric oxide was dissolved in a melt of sodium hexametaphosphate. Complete solution was obtained in 30 seconds. The melt was chilled rapidly to form a transparent glass soluble in water. 1.25 cc. of a 5% solution of this melt reduced the viscosity of 250 cc. of a drilling mud from 47 centipoises to 15 centipoises at 600 R. P. M. A similar amount of a 5% solution of hexametaphosphate reduced the viscosity of 250 cc. of the same mud to 21 centipoises at 600 R. P. M.

These two samples were heated in steam chest for 18 hours at 65° C. The first then had a viscosity of 22 centipoises and the second a viscosity of 35 centipoises at 600 R. P. M.

*Example III*

About 5% by weight of beryllium oxide was dissolved in a melt of sodium hexametaphosphate. Upon complete solution occurring the melt was cooled rapidly, forming a transparent glass.

1 cc. of a 5% water solution of this glass reduced the required driving force of 200 cc. of mud at 600 R. P. M. from 150 grams to 85 grams. 1 cc. of a 5% solution of sodium hexametaphosphate reduced the required driving force to 92 grams.

These samples were placed in steam chest at 60° C. for 24 hours. The required driving force for the first at 600 R. P. M. was then 100; that of the second was 110.

As mentioned in preceding paragraphs, mud fluids contain colloidal matter consisting of both gel forming and non-gel forming types. The colloidal material in most formations encountered in the Gulf Coast area of the United States consists chiefly of the gel forming type and this type of material not only causes high gelation, but high viscosity as well. The maximum density of the mud fluids which are suitable for drilling purposes and prepared from the formation material encountered as the well is drilled is limited in most cases to 1.2. By using the complex phosphate glasses of the present invention in the mud, the density can be increased to 1.3 without any appreciable change in viscosity by allowing more of the formation material to concentrate in the mud.

Although the above discussion has been confined to controlling the properties of clay suspensions, this material may also be used to disperse suspension of other types of mineral matter, such as silica, barytes, and iron oxide.

The nature and objects of the present invention having thus been described and illustrated by specific examples, which are only illustrated, what is claimed as new and useful and is desired to be secured by Letters Patent is:

1. The method of improving a drilling mud which comprises adding thereto a water soluble glass comprising an alkali metal phosphate homogeneously associated with an oxygen-containing compound of beryllium.

2. The method of improving a drilling mud which comprises adding thereto a water soluble glass comprising an alkali metal hexametaphosphate homogeneously associated with an oxygen-containing compound of beryllium.

3. The method of improving a drilling mud which comprises adding thereto a water soluble glass containing beryllium in a sodium hexametaphosphate molecule, prepared by dissolving beryllium oxide in a melt of sodium hexametaphosphate in an amount varying from about 2% by weight to the saturation point, and quickly chilling the resulting solution.

4. The method according to claim 3 in which the beryllium oxide content of the added glass is between 2% and 10% by weight.

5. A drilling mud comprising a suspension of clay containing in solution a water-soluble glass comprising an alkali metal phosphate homogeneously associated with beryllium in compounded form.

6. A drilling mud comprising a suspension of clay containing in solution a water soluble glass comprising an alkali metal hexametaphosphate chemically combined with beryllium.

7. A method of improving a drilling mud which comprises adding thereto a water soluble glass resulting from the fusing of an alkali metal hexametaphosphate with an oxygen-containing compound of beryllium, and rapidly chilling the melt.

8. A drilling mud comprising an aqueous dispersion of clay containing an added water soluble glass comprising an alkali metal phosphate homogeneously associated with an oxygen containing compound of beryllium.

9. A drilling mud comprising an aqueous dispersion of clay containing an added water soluble glass comprising an alkali metal hexametaphosphate homogeneously associated with an oxygen containing compound of beryllium.

MILTON WILLIAMS.